Dec. 16, 1969 G. A. HOWELLS 3,484,761

PULSE TRANSFORMERS COMPRISING STACKED FERRITE BLOCKS

Filed May 11, 1966 2 Sheets-Sheet 1

Inventor
GEORGE A. HOWELLS
By [signature]
Attorney

Dec. 16, 1969 G. A. HOWELLS 3,484,761

PULSE TRANSFORMERS COMPRISING STACKED FERRITE BLOCKS

Filed May 11, 1966 2 Sheets-Sheet 2

Inventor
GEORGE A. HOWELLS
By [signature]
Attorney

United States Patent Office 3,484,761
Patented Dec. 16, 1969

3,484,761

PULSE TRANSFORMERS COMPRISING STACKED FERRITE BLOCKS

George Aneurin Howells, Herts, England, assignor to International Standard Electric Corporation, New York, N.Y., a corporation of Delaware Filed May 11, 1966, Ser. No. 549,265
Claims priority, application Great Britain, June 9, 1965, 24,395/65
Int. Cl. G11b *5/00*
U.S. Cl. 340—174 2 Claims

ABSTRACT OF THE DISCLOSURE

A multiple pulse transformer arrangement in which a common transformer core comprises two or three stacked ferrite blocks. With two blocks, one or both of the blocks have parallel full width grooves in the contacting surface. With three blocks, the middle block has grooves in both surfaces while the outer blocks may each have a plane or a grooved contacting surface. The windings are inserted into the grooves with the blocks separated, and each individual transformer having windings formed by conductors which are inserted into complementary grooves of adjacent blocks.

This invention relates to pulse transformers.

Pulse transformers are used in selection systems in word organized magnetic information stores to provide bi-polar current pulses in a common read/write word conductor, and to provide isolation between word conductors and co-ordinate access switch transients so that common mode noise is suppressed.

Suitable transformers realised by conventional methods are expensive and difficult to incorporate in the large numbers required.

An object of the present invention is to overcome this difficulty.

According to the invention there is provided a multiple pulse transformer including two blocks of magnetic material in face to face contact, with the contacting face of at least one of said blocks having a plurality of grooves therein, and individual transformer windings formed by conductors inserted in the grooves.

Preferred embodiments of the invention will now be described with reference to the accompanying drawings, in which.

Figures 1, 2, 3:
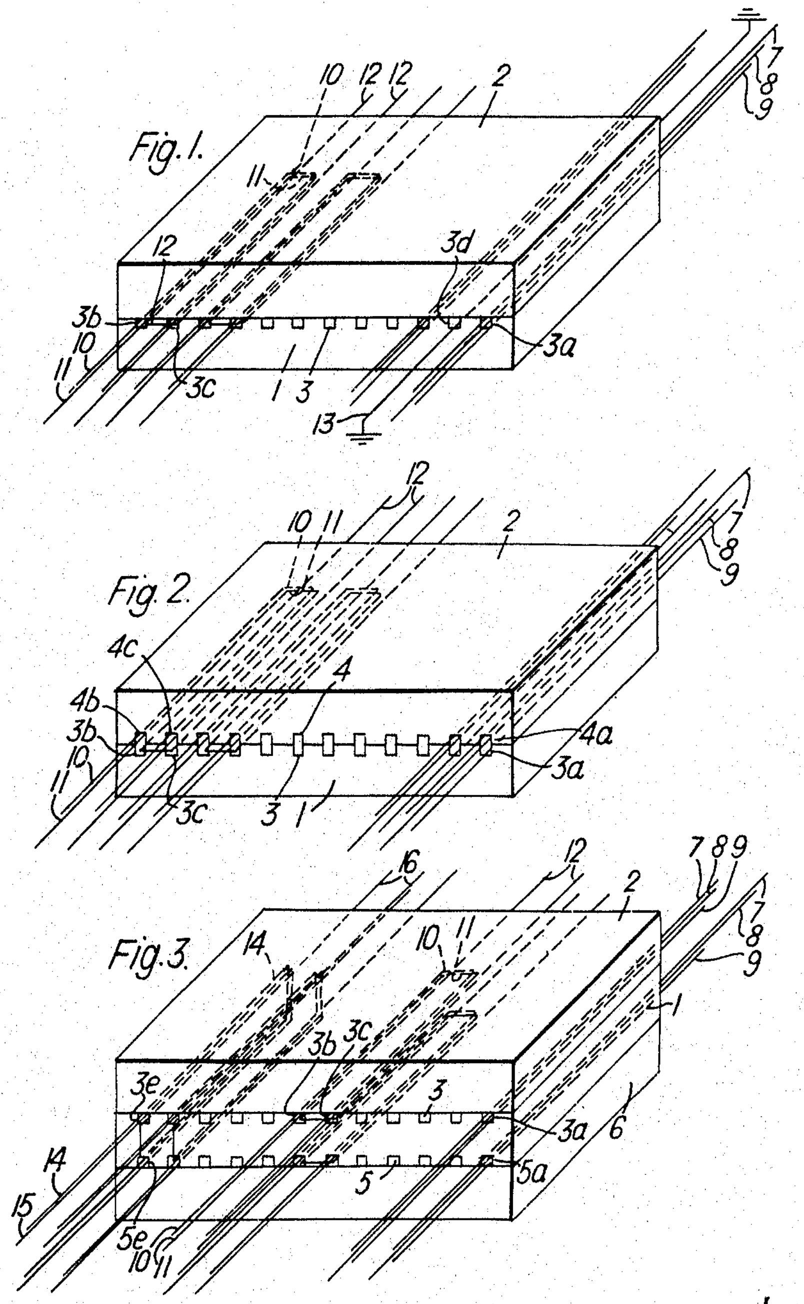
FIGS. 1 to 3 are oblique views of three different embodiments of a multiple pulse transformer each partly wired to illustrate alternative wiring methods.

Referring to FIG. 1, blocks 1 and 2 of polished low reluctance ferrite material are maintained in face to face contact by any suitable means, not shown. In the contacting face of the block 1 are parallel grooves 3 extending the full width of the block.

In FIG. 2, the block 2 additionally has a plurality of grooves 4 in its contacting face, the grooves 4 being aligned with the grooves 3.

In FIG. 3, the face of the block 1 remote from the block 2 has a plurality of grooves 5, and there is a third block 6 of polished low reluctance ferrite material in face to face contact with the remote face of the block 1.

The grooves 3 and 5 may be in alignment, as shown, or staggered.

The sandwich arrangement of the three blocks 1, 2 and 6 shown in FIG. 3 may also be realised with blocks 2 and 6 having grooves in their respective contacting faces, the grooves in each block 2 and 6 being in alignment with the corresponding grooves in the block 1.

Wiring of the blocks to provide individual transformer windings is performed with the blocks separated, and in each embodiment an individual transformer has two primary windings and a secondary winding, although in general there may be one or more primary windings and one or more secondary windings.

For the multiple transformer core construction of FIG. 1, three conductors 7, 8 and 9 are all inserted into a single groove 3*a* for each individual transformer. Alternatively, the primary windings are formed by two conductors 10 and 11 each half looped by insertion into the same two adjacent grooves 3*b* and 3*c*, with the bights of the loops on one side of the block 1, and the secondary winding is formed by a conductor 12 half looped by insertion into the grooves 3*b* and 3*c*, with the bight of the loop on the other side of the block 1.

Despite close packing, adequate isolation between individual transformers is achieved from most store access operations. Greater isolation results from interleaved slots having shorted turns. This is shown in FIG. 1 by a single short circuited conductor 13 inserted into groove 3*d* between two single groove winding transformers. It is to be understood that this provision of shorted turns between adjacent individual transformers is equally applicable when other wiring methods are used.

Capacitance coupling between primary and secondary windings is low, but may be reduced further by the introduction of insulated spacers between the windings in a groove, whatever winding technique is used.

In the construction shown in FIG. 2, the same basic alternative winding formation is used as that for FIG. 1, except that with the block 2 also provided with grooves, insertion of the primary winding conductors into the grooves in one block may be performed separately from the insertion of the secondary winding conductors into complementary grooves in the other block.

Thus as shown in FIG. 2, individual transformers may each have two primary windings formed by conductors 7 and 8 inserted into groove 4*a* in the block 2 and a secondary winding formed by conductor 9 inserted into the complementary groove 3*a* in the block 1.

Alternatively, the primary windings are formed by conductors 10 and 11 each half looped by insertion with adjacent grooves 4*b* and 4*c*, and the secondary winding is formed by conductor 12 half looped by insertion into the complementary grooves 3*b* and 3*c* in the block 1.

In the construction shown in FIG. 3, the primary and secondary windings of each individual transformer may be formed either by the conductors 7, 8 and 9 inserted into a single groove 3*a* or 5*a* in the block 1, or by the conductors 10, 11 and 12 half looped between adjacent grooves 3*b* and 3*c* in the block 1, in a similar manner to that described for FIG. 1. When the contacting faces of either the block 1 or the block 6 is grooved, the primary winding conductors 7 and 8 or 10 and 11 are inserted into grooves in the block 2 or the block 6 and the secondary winding conductors 9 or 12 are inserted into complementary grooves in the block 1.

A third alternative is to form the primary and secondary windings by conductors 14, 15 and 16 oppositely half looped by insertion into a groove 3 and into a groove 5*e* around the block 1.

A half looped arrangement of conductors around a block similar to that for the conductors 14, 15 and 16, may be achieved by utilising straight conductors inserted into a single groove or into two complementary grooves in adjacent blocks, similar to that for the conductors 7, 8 and 9, and connecting one end of the straight conductors to a common earth return point formed by one or two conducting plates each in contact with the free surface of one of the blocks.

The conductors forming the windings may be of insulated wire, or a printed circuit arrangement can be used at least for the primary windings, in which the primary windings comprise conducting strips on each side of a suitable substrate, which also holds the access components for a magnetic store, i.e. the access wiring and transformer primaries are integrated. The printed substrate is slotted to permit insertion into the block.

Magnetic material other than ferrite material may be used for the core of the multiple sub transformer. An example of another suitable magnetic material is Permalloy.

Typical dimensions for the magnetic material core are a block width of 0.5 to 1.0 inch, a block depth of 0.125 inch, with grooves of 0.005 to 0.010 inch wide and 0.015 to 0.020 inch deep on a pitch of 0.020 inch.

When the multiple pulse transformers are to be used in conjunction with a magnetic store in which the individual storage elements or devices are arranged co-ordinately or at least in rows and are threaded by a conductor or conductors which terminate at or are associated with the multiple pulse transformers, it is convenient to wire the multiple pulse transformers simultaneously with the elements of the store.

Figure 4:
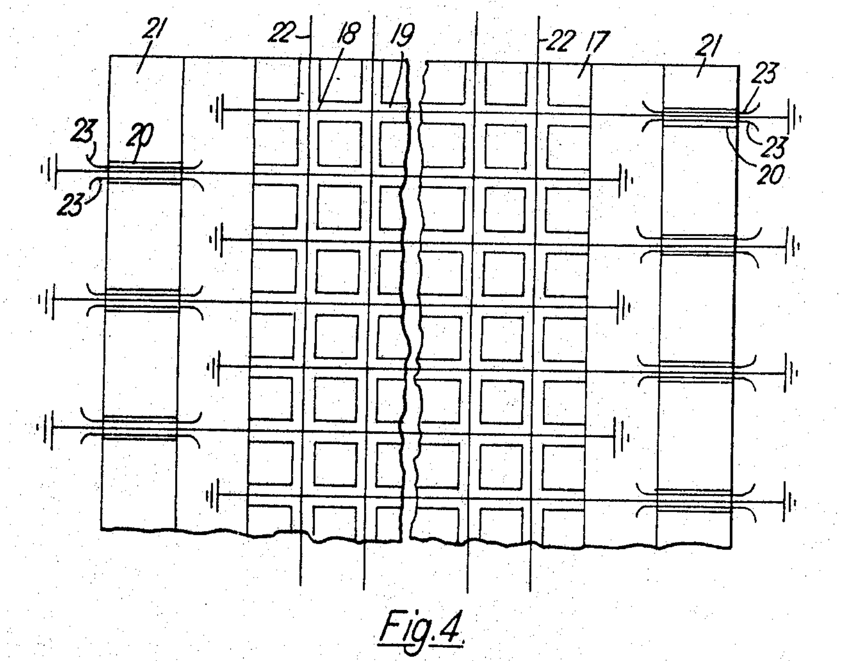
FIG. 4 is a partial plan view of a magnetic storage device and associated multiple pulse transformers forming part of the access circuitry.

This information storage equipment is illustrated in FIG. 4, in which a partly-wired magnetic store of the so-called waffle-iron type (1963 Proceedings of the Intermag Conference—International Conference on Non-Linear Magnetics, The Cubic Waffle-Iron Memory, A. H. Bobeck, pp. 3–2–1 to 3–2–6) and comprising a co-ordinately grooved ferrite block 17 has its word conductors 18 inserted in parallel grooves 19 and extending alternately on opposite sides of the block to pass through grooves 20 in the ferrite block cores of multiple pulse transformers 21 and forming the secondary windings thereof.

Initial wiring is performed by simultaneously inserting the set of word conductors into the aligned grooves in the transformer and in the store, followed by appropriate connection of the wire ends to earth, etc.

Other store conductors, such as the digit sense conductors 22 and the primary windings 23 of the multiple pulse transformers are also shown.

By inserting the primary windings into one block and the secondary windings into a second block, it is possible to use the transformer arrangement (similar to a plug and socket) for isolating part of the access circuitry from the store. This is useful for construction and maintenance.

It is to be understood that the foregoing description of specific examples of this invention is not to be considered as a limitation on its scope.

What I claim is:

1. A multiple pulse transformer arrangement for a magnetic store having individual storage elements co-ordinately arranged and threaded by conductors associated with the transformers, the arrangement comprising:

a first ferrite block having in its contacting face a first plurality of parallel grooves extending the full width of the block;

a second ferrite block having in its adjacent contacting face a second plurality of parallel grooves extending the length of the block and in alignment with the grooves in said first block;

a pair of primary windings of an individual transformer are formed by primary conductors each half looped by insertion with adjacent grooves in said first block; and a secondary winding of said individual transformer is formed by a secondary conductor half looped by insertion into complementary adjacent grooves in said second block.

2. The arrangement of claim 1 including: said second ferrite block having a third plurality of parallel grooves extending the full width of the block, in another contacting face, oppositely located and in alignment with said second plurality grooves, a third ferrite block having in its contacting face a fourth plurality of parallel grooves in alignment with said third grooves, and the windings of another individual transfer are formed by at least one of the conductors inserted as a half loop into two adjacent grooves of the third plurality of grooves and another of the conductors inserted as a half loop into two corresponding aligned grooves in the contacting face of the third block.

References Cited

UNITED STATES PATENTS

| | | | |
|---|---|---|---|
| 2,776,411 | 1/1957 | Anderson | 336—221 X |
| 2,825,892 | 3/1958 | Duinker | 336—212 X |
| 3,222,656 | 12/1965 | Olsson | 340—174 |
| 3,259,888 | 7/1966 | Conely et al. | 340—174 |
| 3,351,879 | 11/1967 | Kaufman | 336—221 X |
| 3,177,473 | 4/1965 | Schoenmakers | 340—174 |

STANLEY M. URYNOWICZ, Jr., Primary Examiner

U.S. Cl. X.R.

336—170, 212, 234